(12) United States Patent
Kee

(10) Patent No.: US 7,387,648 B2
(45) Date of Patent: Jun. 17, 2008

(54) SOLID ELECTROLYTIC CAPACITOR AND MANUFACTURING METHOD THEREOF

(75) Inventor: Lik Wing Kee, Dongguan (CN)

(73) Assignee: Samxon Electronics (Dong Guan) Co., Ltd., Guangdong Province (CN)

( * ) Notice: Subject to any disclaimer, the term of this patent is extended or adjusted under 35 U.S.C. 154(b) by 0 days.

(21) Appl. No.: 11/502,553

(22) Filed: Aug. 11, 2006

(65) Prior Publication Data
US 2006/0279909 A1    Dec. 14, 2006

(51) Int. Cl.
*H01G 9/00* (2006.01)
(52) U.S. Cl. ............ 29/25.03; 361/509; 361/517; 361/523; 361/525; 361/527; 257/E21.291
(58) Field of Classification Search ............ 361/509, 361/517, 523, 525, 527
See application file for complete search history.

(56) References Cited

U.S. PATENT DOCUMENTS 5,117,333 A * 5/1992 Kakuma et al. ............ 361/527
6,307,735 B1 * 10/2001 Saito et al. ................. 361/517
2002/0001168 A1 * 1/2002 Ohata et al. ............... 361/523

* cited by examiner

*Primary Examiner*—Michael S. Lebentritt
*Assistant Examiner*—Kyoung Lee
(74) *Attorney, Agent, or Firm*—Rossenberg, Klein & Lee

(57) ABSTRACT

The invention relates to a coil type solid electrolytic capacitor containing solid organic polymer with high electrical conductivity as electrolyte and its manufacturing method. In the invention, such processes as oxidation, carbonization, immersing, chemical oxypolymerization, and so on are fully disclosed. The solid electrolytic capacitor of the invention has a pretty low equivalent series resistance (ESR), good impedance frequency properties, so can be used at a frequency above 1 MHz. And it has a high anti-ripple current capacity, wide applicable range of temperature, good temperature properties, large capacity, long life, and reliable performance, therefore can be widely applied in the fields of modern communication, computer, and high performance civilian and military electronic products.

14 Claims, 2 Drawing Sheets

SOLID ELECTROLYTIC CAPACITOR AND MANUFACTURING METHOD THEREOF

FIELD OF THE INVENTION

The present invention relates to a coil type solid electrolytic capacitor containing solid organic polymer with high electrical conductivity as electrolyte and a manufacturing method thereof.

BACKGROUND OF THE INVENTION

Capacitor is a primary electronic element, which is widely applied in various kinds of electronic products. In recent years, with the high-speed development of electronic industry, the electronic products trend to be miniaturized and light-weighted, especially after the advent of digital products and the requirements of speeding-up personal computer. As a result, the applied capacitor is required to be miniaturized and have such properties as large capacity, low impedance in high-frequency range, and so on.

As a capacitor for high frequency (HF) filtering, the presently-used capacitors such as mica capacitor, film capacitor, and porcelain capacitor only have limited capacity. Although they are used, they are not adequate to the requirement of large capacity. In order to meet the requirement of large capacity, aluminum electrolytic capacitor and tantalum electrolytic capacitor were developed. In the traditional aluminum electrolytic capacitor, large capacity is obtained with low cost. However, it has such shortcoming as low conductivity, poor temperature and frequency properties due to using liquid electrolyte. Furthermore, with the used time increasing, and especially using temperature rising, the liquid electrolyte becomes more and more fugitive and vaporized. As a result, its capacity decreases and the impedance increases. In the traditional tantalum electrolytic capacitor, solid manganese dioxide is used as electrolyte, and the properties are better than that of traditional aluminum electrolytic capacitor. Nevertheless, the capacity of said tantalum electrolytic capacitor, and especially the impedance properties under HF are not adequate to the requirements of the new electronic devices yet.

In order to eliminate the above-mentioned problems, researchers brought forth the solution using conductive macromolecule with good conductibility, which is apt to form solid electrolyte as electrolyte. Even more, it was disclosed that such conductive organic compounds containing π conjugated macromolecule as derivatives of polyaniline, polypyrrole and polythiophene and intrinsic conductive macromolecule with conductivity ranging from $10^{-3}$ to $10^3$ s/cm were used as solid electrolyte (referring to Japanese and American patents). Researchers had fully studied what special electric, magnetic and optical properties of electronic conjugated system the conductive macromolecules have. These conductive macromolecules were mainly prepared via electrolytic polymerization and chemical oxypolymerization. The chemical oxypolymerization therein mentioned is carried out via mixing monomer and proper quantity of oxidant, by which conductive macromolecules are easy to be prepared, and it is a simple industrial process of polymerization. Presently, the existing problems of the common used chemical oxypolymerization is: polymerizing rate is in direct proportion to the activity of oxidant, therefore in case that highly active oxidant is used, the undesired side reactions tend to occur, resultingly the polymer with poor regularity of structure and poor conductivity is obtained. This is therefore an object of the present invention to settle the technical problems. Additionally, the process for manufacturing solid electrolytic capacitor of organic polymer with high electrical conductivity differs from the traditional process for manufacturing liquid electrolytic capacitor and solid electrolytic capacitor of organic semiconductor to a large extends. Temperature and polymerization process became vital to the preparation of solid electrolytic capacitor of organic polymer with high electrical conductivity. As limited by the existing processes of immersing, polymerization, and so on, the capacity of prepared solid electrolytic capacitor could not reach the expected value, and equivalent series resistance (ESR) was large, leakage current properties were poor, and pass percent was low. So it is necessary to improve the process.

DISCLOSURE OF THE INVENTION

The first purpose of the invention is to provide a coiled solid electrolytic capacitor containing organic polymer with high electrical conductivity as electrolyte, which has a pretty low impedance and ESR so as to stand up to a very high ripple current, and has good frequency properties and temperature properties.

The second purpose of the invention is to provide a method for manufacturing the coil type solid capacitor containing organic polymer with high electrical conductivity as electrolyte, and to fully disclose the processes of immersing and polymerization. The solid capacitor prepared following the provided processes has low ESR, good leakage current properties, long life, reliable performances, and high rate of finished products.

The purposes of the present invention are achieved through the schemes as follows:

A solid electrolytic capacitor comprises: a coil type capacitor core formed by coiling anode foil, cathode foil and separate sheet used to insulate the anode foil and cathode foil; two lead wires and two aluminum stems connected with the foils. The core of capacitor forms a capacitor element after oxidized, carbonized, immersed, and chemically oxypolymerized. Then the capacitor element is cased into an aluminum casing and the opening of the casing is sealed with a seal member. After aging and sorting, the capacitor is finally obtained. Therein the anode foil is made of valve metal covered by dielectric oxidation film formed on the surface of the anode foil of valve metal, and the valve metal is aluminum. And the cathode foil is made of aluminum metal. The separate sheet set between anode foil and cathode foil contains solid conductive material. The mentioned solid conductive material is organic polymer with high electrical conductivity made from organic monomer and oxidant via chemical oxypolymerization. The mentioned organic monomer comprises at least one of pyrrole, thiophen, and aniline, or is a mixture mixed by two or above of them pro rata. The mentioned oxidant comprises at least one of ferric salt, persulphate, and bichromate, or is a mixture mixed by two or above of them pro rata. The mentioned separate sheet is made of electrolytic paper containing Manila hemp, or nonwoven of polyester, or compound of polyvinyl alcohol and nylon. The mentioned seal member is ethoxyline, ethylene-propylene rubber (EPR), or butylrubber, which has good sealing property.

The detailed process for manufacturing above-mentioned solid electrolytic capacitor is as follows: firstly anode foil is prepared, and dielectric oxide film is formed on the surface of anode foil. Then the cathode foil is prepared, and the cathode foil is made of aluminum. Between anode foil and cathode foil a separate sheet is inserted. By coiling separate sheet, anode foil, and cathode foil, a core of coiled capacitor is formed. At temperature from 60 to 90° C., the capacitor core is oxidized in the solution of ammonium adipate from 2 to 10% for 10 to 30 minutes, followed by roasting at temperature from 130 to 280° C. for 60 to 180 minutes so as to carbonize the separate sheet. The carbonized core is immersed into the solution containing organic monomer and oxidant at temperature from 20 to 35° C. and atmospheric pressure for 10 to 40 minutes, and then it is taken out and polymerized at temperature from 30 to 210° C. and atmospheric pressure for 0.5 to 6 hour(s). Consequently, the organic polymer with high electrical conductivity is formed. The capacitor core containing the organic polymer with high electrical conductivity is washed with the solvent to remove polymerization residues, so as to lower impedance and leakage current of the capacitor, and so on. The capacitor element prepared following above-mentioned procedures is cased into an aluminum casing, and the opening of the casing is sealed with a seal member. Finally the solid electrolytic capacitor is obtained after aging at 105 to 145° C. for 0.5 to 10 hour(s) and sorting.

The above-mentioned solid electrolytic capacitor can also be prepared via the process as follows: firstly anode foil is prepared, and dielectric oxide film is formed on the surface of anode foil, then the cathode foil is prepared using aluminum. Between anode foil and cathode foil a separate sheet is inserted. By coiling separate sheet, anode foil, and cathode foil, a core of coiled capacitor is formed. At temperature from 60 to 90° C., the capacitor core is oxidized in the solution of ammonium adipate from 2 to 10% for 10 to 30 minutes, followed by roasting at temperature from 130 to 280° C. for 60 to 180 minutes so as to carbonize the separate sheet. The carbonized core is immersed into the solution containing organic monomer and oxidant at ambient temperature and under vacuum for 10 to 40 minutes, and then it is taken out and polymerized at temperature from 30 to 210° C. and atmospheric pressure for 0.5 to 6 hour(s). Consequently, the organic polymer with high electrical conductivity is formed. The capacitor core containing the organic polymer with high electrical conductivity is washed with the solvent to remove polymerization residues, so as to lower impedance and leakage current of the capacitor, and so on. The capacitor element prepared following above-mentioned procedures is cased into an aluminum casing, and the opening of the casing is sealed with a seal member. Finally the solid electrolytic capacitor is obtained after aging at 105 to 145° C. for 0.5 to 10 hour(s) and sorting.

The mentioned separate sheet is made of electrolytic paper containing Manila hemp, or nonwoven of polyester, or compound of polyvinyl alcohol and nylon, and its density ranges from 0.2 to 0.7 g/cm³, and thickness from 30 to 70 μm. Electrolytic paper of a Manila hemp, nonwoven fabric of polyester, or compound of polyvinyl alcohol and nylon needs to be carbonized at temperature from 130 to 280° C. so as to enhance the permeability of organic monomer as it is used as the separate sheet material.

The mentioned organic monomer of organic compound with high electrical conductivity comprises at least one of pyrrole, thiophen, and aniline. Besides this, the organic monomer can also be a mixture mixed by two or above of the above-mentioned organic monomer pro rata.

The mentioned oxidant comprises at least one of ferric salt, persulphate, and bichromate. Besides this, the oxidant can also be a mixture mixed by two or above of the above-mentioned oxidants pro rata.

After the capacitor core is immersed in mixed solution of organic monomer and oxidant at atmospheric pressure or under vacuum, and is taken out and chemically oxypolymerized at atmospheric pressure, the obtained capacitor core containing the organic polymer with high electrical conductivity is washed with the solvent to remove the polymerization residues, which can lower impedance and leakage current of the capacitor, and so on. The solvent is one of alcohol, acid, ester, aether and amine. The capacitor element is cased into an aluminum casing. The opening of the aluminum casing is sealed with a seal member made of ethoxyline, EPR, or butylrubber.

The solid electrolytic capacitor manufactured following the present invention has a pretty low ESR, good impedance frequency properties, so can be used at a frequency above 1 MHz. And it has a high anti-ripple current capacity, wide applicable range of temperature, good temperature properties, large capacity, long life, and reliable performance, therefore can be widely applied in the fields of modern communication, computer, and high performance civilian and military electronic products.

Figure 1:
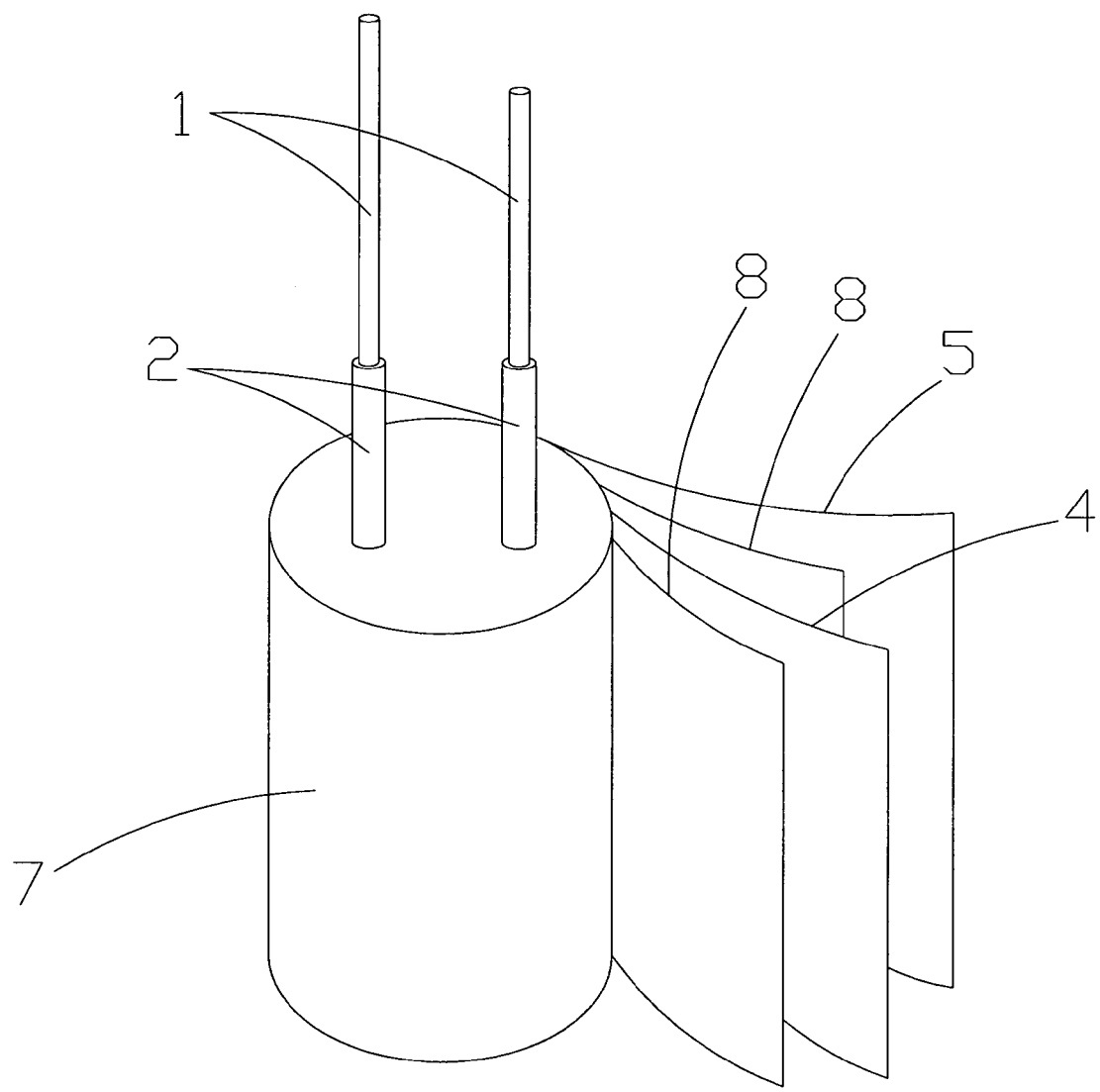
FIG. 1 is a scenograph of a solid electrolytic capacitor of the present invention.
Figure 2:
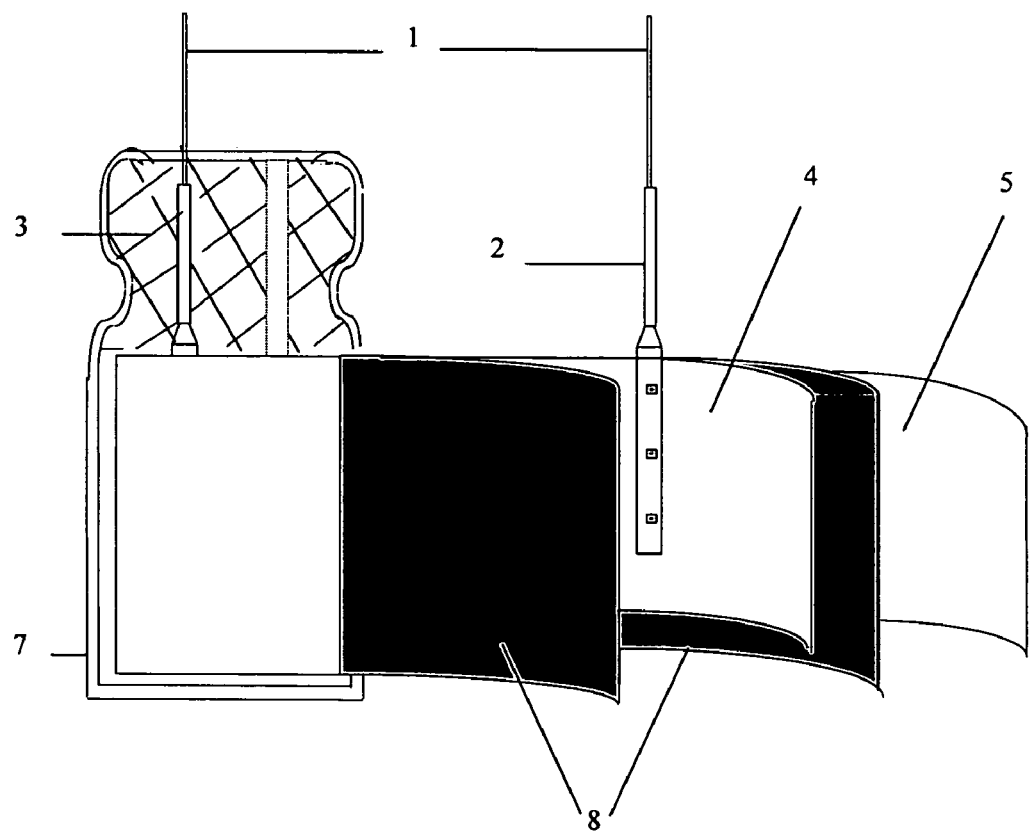
FIG. 2 is a partial exploded view of a core in the solid electrolytic capacitor of the present invention.
Figure 3:
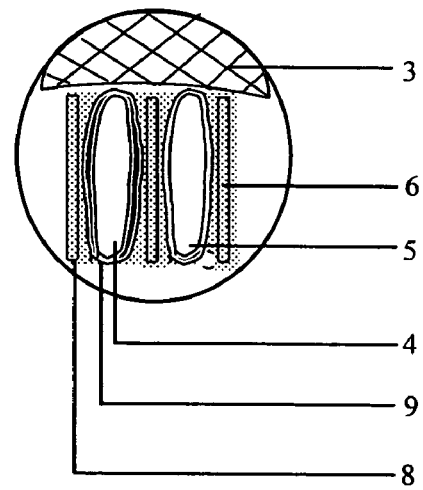
FIG. 3 is a sectional view of anode foil, cathode foil, oxide film and separate sheet in the solid electrolytic capacitor of the present invention.

1—lead wire of capacitor; 2—aluminum stem; 3—seal member; 4—anode foil; 5—cathode foil;

6—solid organic conductive material; 7—aluminum casing; 8—separate sheet; 9—film of $Al_2O_3$.

DESCRIPTION OF THE PREFERRED EMBODIMENTS

The preferred embodiment of the solid electrolytic capacitor of the present invention will now be described hereinafter with reference to the accompanying drawings.

A solid electrolytic capacitor comprises: a coil type capacitor core formed by coiling anode foil 4, cathode foil 5 and separate sheet 8 used to insulate the anode foil 4 and cathode foil 5; two lead wires 1 and two aluminum stems 2 connected with the foils. The core of capacitor forms a capacitor element after oxidized, carbonized, immersed, and chemically oxypolymerized. Then the capacitor element is cased into an aluminum casing 7 and an opening of the casing is sealed with a seal member 3. After aging and sorting, the capacitor is finally obtained. Therein the anode foil 4 is made of valve metal covered by dielectric oxidation film 9 formed on the surface of the anode foil 4 of valve metal, and the valve metal is aluminum. And the cathode foil 5 is made of aluminum metal. The separate sheet 8 set between anode foil 4 and cathode foil 5 contains solid conductive material 6. The mentioned solid conductive material 6 is organic polymer with high electrical conductivity made from organic monomer and oxidant via chemical oxypolymerization. The mentioned organic monomer comprises at least one of pyrrole, thiophen, and aniline, or is a mixture mixed by two or above of them pro rata. The mentioned oxidant comprises at least one of ferric salt, persulphate, and bichromate, or is a mixture mixed by two or above of them pro rata. The mentioned separate sheet 8 is made of electrolytic paper containing Manila hemp, or nonwoven of polyester, or compound of polyvinyl alcohol and nylon. The mentioned seal member is ethoxyline, ethylene-propylene rubber (EPR), or butylrubber, which has good sealing property.

The manufacturing method of the present invention is further illustrated via the following embodiments.

Embodiment 1

Between the anode aluminum foil and the cathode aluminum foil the electrolytic paper containing Manila hemp was inserted, whose density ranged from 0.2 to 0.6 g/cm$^3$, and thickness ranged from 30 to 60 μm. By coiling them, a core of coiled capacitor was formed. At temperature of 90° C., the capacitor core was oxidized in 5% ammonium adipate solution for 30 minutes, followed by roasting at 240° C. for 90 minutes so as to fully carbonize the electrolytic paper. The carbonized core was immersed into ferric toluenesulfonate n-butyl alcohol solution containing 3,4-ethylene dioxthiophen (EDT) from 5% to 25% at temperature from 20 to 35° C. and atmospheric pressure for 30 minutes, and then it was taken out and polymerized under atmospheric pressure and at 65° C. for 1 hour and 115° C. for 1 hour and 135° C. for 2 hours. Through the chemical oxypolymerization the organic polymer with high electrical conductivity, PEDT, was formed. After the capacitor core is washed with absolute alcohol to remove residues, a core of solid aluminum electrolytic capacitor with rated voltage 4 V, electrostatic capacity 560 μF was obtained. The capacitor core was then cased into an aluminum casing, and the opening of the casing was sealed with ethoxyline, EPR, or butylrubber. Finally the solid electrolytic capacitor was obtained after aging at 105 C for 5 hours and sorting, whose dimension was D8 mm×L10.5 mm.

Embodiment 2

Between the anode aluminum foil and the cathode aluminum foil the electrolytic paper containing Manila hemp was inserted, whose density ranged from 0.2 to 0.6 g/cm$^3$, and thickness from 30 to 60 μm. By coiling them, a core of coiled capacitor was formed. At temperature of 90° C., the capacitor core was oxidized in 5% ammonium adipate solution for 30 minutes, followed by roasting at 240° C. for 90 minutes so as to fully carbonize the electrolytic paper. The carbonized core was immersed into n-butyl alcohol solution of ferric toluenesulfonate containing 3,4-EDT from 5% to 25% in a vacuum pressure below 20 mmHg for 30 minutes, and then it was taken out and chemically oxypolymerized. The following procedures were similar to embodiment 1. Finally a solid electrolytic capacitor was prepared.

Embodiment 3

The procedure was similar to embodiment 2, except that 15% polyethylene glycol was added into the n-butyl alcohol solution of ferric toluenesulfonate containing 3,4-EDT from 5% to 25%.

Embodiment 4

The procedure was similar to embodiment 2, except that 3% diethanolameine was added into the n-butyl alcohol solution of ferric toluenesulfonate containing 3,4-EDT from 5% to 25%.

Embodiment 5

The procedure was similar to embodiment 2, except that 2.5% paranitrophenol was added into n-butyl alcohol solution of ferric toluenesulfonate containing 3,4-EDT from 5% to 25%.

The initial properties and life properties of the solid electrolytic capacitor with rated voltage 4 V, electrostatic capacity 560 μF (dimension: D 8 mm×L 10.5 mm) according to embodiment 1 to 5 was shown in table (see also Table 1).

TABLE 1

| | Initial properties | | | | Life properties after used at 105° C. for 2000 hours | | | |
|---|---|---|---|---|---|---|---|---|
| | Capacity/120 Hz (μF) | DF/120 Hz (%) | Leakage current/minute (μA) | ESR/100 kHz (mΩ) | Capacity/120 Hz (μF) | DF/120 Hz (%) | Leakage current/minute (μA) | ESR/100 kHz (mΩ) |
| Embodiment 1 | 546 | 3.70 | 22.5 | 6.8 | 492 | 4.25 | 15.6 | 10.2 |
| Embodiment 2 | 558 | 3.51 | 18.6 | 6.5 | 512 | 3.85 | 12.6 | 9.5 |
| Embodiment 3 | 562 | 3.52 | 8.6 | 6.3 | 525 | 3.82 | 6.8 | 9.2 |
| Embodiment 4 | 560 | 3.56 | 7.8 | 6.2 | 526 | 3.92 | 6.6 | 9.3 |
| Embodiment 5 | 566 | 3.62 | 8.1 | 6.4 | 522 | 3.98 | 7.0 | 9.6 |

It was known from the table that capacity of the solid electrolytic capacitor produced in embodiment 2 was 2% higher than that in embodiment 1 since Vacuum immersing process was applied in embodiment 2, and in embodiment 3~5, the leakage current was less than that in embodiment 2 due to the addition of additives in immersing solution for reducing the leakage current.

It can be seen from the embodiments that the solid electrolytic capacitor produced following the present invention has a low ESR, good leakage current properties, long life, reliable performance, and high pass percent of finished products, therefore can be widely applied in modern electronic industry.

What is claimed is:

1. A manufacturing method of a solid electrolytic capacitor, comprising: providing an anode foil made of metal aluminum; forming a dielectric oxide film on the surface of anode foil of metal aluminum; providing a cathode foil made of metal aluminum; setting a separate sheet between said anode foil and said cathode foil; coiling said separate sheet, said anode foil and said cathode foil together, thus forming a core of a coil type capacitor, forming a capacitor element comprising organic polymer with high electrical conductivity via oxidation, carbonization, immersing and chemical oxypolymerization; washing with solvent; casing into an aluminum casing, the opening of said casing being sealed with a seal member; and processing by aging and sorting;

said core of said capacitor is oxidized in a 2 to 10% solution of adipate ammonium at a temperature from 60 to 90° C. for 10 to 30 minutes.

2. The manufacturing method of a solid electrolytic capacitor of claim 1, wherein said separate sheet is made of electrolytic paper containing Manila hemp, or nonwoven of polyester, or compound of polyvinyl alcohol and nylon.

3. The manufacturing method of a solid electrolytic capacitor of claim 1, wherein said core of capacitor is carbonized at temperature from 130 to 280° C., and roasted for 60 to 180 minutes.

4. The manufacturing method of a solid electrolytic capacitor of claim 1, wherein said immersing and chemical oxypolymerization process of said core comprise: immersing said core in solution of organic monomer and oxidant for 10 to 40 minutes, and then being polymerized at temperature from 30 to 210° C. and atmospheric pressure for 0.5 to 6 hours.

5. The manufacturing method of a solid electrolytic capacitor of claim 4, wherein said immersing process of said core is undertaken at temperature from 20 to 35° C. and atmospheric pressure.

6. The manufacturing method of a solid electrolytic capacitor of claim 4, wherein said immersing process of said core is undertaken in vacuum.

7. The manufacturing method of a solid electrolytic capacitor of claim 4, wherein said organic monomer comprises at least one of pyrrole, thiophen and aniline.

8. The manufacturing method of a solid electrolytic capacitor of claim 4, wherein said organic monomer is a mixture comprising two or above of pyrrole, thiophen and aniline pro rata.

9. The manufacturing method of a solid electrolytic capacitor of claim 4, wherein said oxidant comprises at least one of ferric salt, persulphate and bichromate.

10. The manufacturing method of a solid electrolytic capacitor of claim 4, wherein said oxidant is a mixture comprising two or above of ferric salt, persulphate and bichromate pro rata.

11. The manufacturing method of a solid electrolytic capacitor of claim 1, wherein said organic polymer with high electrical conductivity is made from organic monomer and oxidant via chemical oxypolymerization.

12. The manufacturing method of a solid electrolytic capacitor of claim 1, wherein said solvent is one of alcohol, acid, ester, and amine.

13. The manufacturing method of a solid electrolytic capacitor of claim 1, wherein said seal member is made of ethoxyline rubber, ethylene-propylene rubber, or butyl rubber.

14. The manufacturing method of a solid electrolytic capacitor of claim 1, wherein said aging process is undertaken at temperature of 105 to 145° C. for 0.5 to 10 hours.

* * * * *